United States Patent [19]
Cikanek

[11] Patent Number: 5,450,324
[45] Date of Patent: Sep. 12, 1995

[54] ELECTRIC VEHICLE REGENERATIVE ANTISKID BRAKING AND TRACTION CONTROL SYSTEM

[75] Inventor: Susan R. Cikanek, Wixom, Mich.

[73] Assignee: Ford Motor Company, Dearborn, Mich.

[21] Appl. No.: 1,603

[22] Filed: Jan. 7, 1993

[51] Int. Cl.[6] ............................. B60L 7/10; B60T 8/58
[52] U.S. Cl. ........................... 364/426.02; 364/426.03; 303/3; 303/20
[58] Field of Search ................. 364/426.02, 426.03, 364/424.05, 426.01; 180/197, 165, 65.3; 188/156, 159, 181 T; 303/3, 93, 103, 112, 113.2, 20

[56] References Cited

U.S. PATENT DOCUMENTS

| | | | |
|---|---|---|---|
| 4,270,806 | 6/1981 | Venkaperumal et al. | 303/3 |
| 4,489,382 | 12/1984 | Jonner et al. | 364/426.02 |
| 4,671,576 | 6/1987 | Fourie | 303/93 |
| 4,671,577 | 7/1987 | Woods | 303/3 |
| 4,761,741 | 8/1988 | Agarwal et al. | 364/426 |
| 4,778,223 | 10/1988 | Inoue | 303/100 |
| 4,794,538 | 12/1988 | Cao et al. | 364/426.02 |
| 4,809,175 | 2/1989 | Hosaka et al. | 364/424.01 |
| 4,809,183 | 2/1989 | Eckert | 364/426.04 |
| 4,842,342 | 6/1989 | Takahashi et al. | 303/102 |
| 4,916,619 | 4/1990 | Walenty et al. | 364/426.02 |
| 4,930,084 | 5/1990 | Hosaka et al. | 364/426.04 |
| 4,947,332 | 8/1990 | Ghoneim | 364/426.03 |
| 4,962,969 | 10/1990 | Davis | 364/426.02 |
| 5,001,640 | 3/1991 | Matsumoto et al. | 364/426.02 |
| 5,029,090 | 7/1991 | Kuhn et al. | 364/426.04 |
| 5,033,002 | 7/1991 | Sol | 364/426.03 |
| 5,148,883 | 9/1992 | Tanaka et al. | 180/165 |
| 5,222,568 | 6/1993 | Higasa et al. | 180/165 |
| 5,322,352 | 6/1994 | Ohno et al. | 364/426.01 |

*Primary Examiner*—Kevin J. Teska
*Assistant Examiner*—Tan Nguyen
*Attorney, Agent, or Firm*—Roger L. May; Allan J. Lippa

[57] ABSTRACT

An antiskid braking and traction control system for an electric or hybrid vehicle having a regenerative braking system operatively connected to an electric traction motor, and a separate hydraulic braking system includes one or more sensors for monitoring present vehicle parameters and a processor, responsive to the sensors, for calculating vehicle parameters defining the vehicle behavior not directly measurable by the sensors and determining if regenerative antiskid braking control, requiring hydrualic braking control, or requiring traction control are required. The processor then employs a control strategy based on the determined vehicle state and provides command signals to a motor controller to control the operation of the electric traction motor and to a brake controller to control fluid pressure applied at each vehicle wheel to provide the appropriate regenerative antiskid braking control, hydraulic braking control, and traction control.

20 Claims, 10 Drawing Sheets

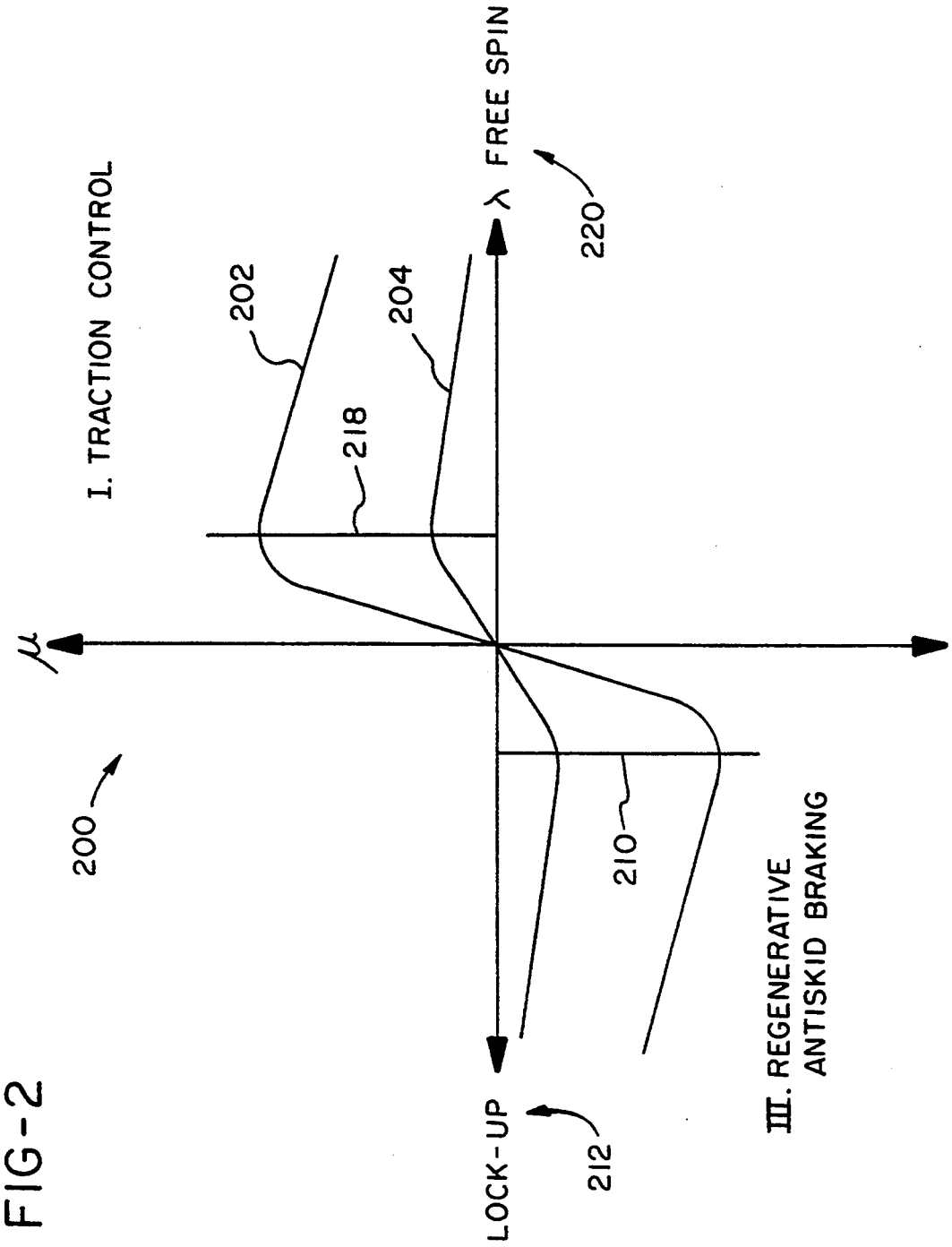

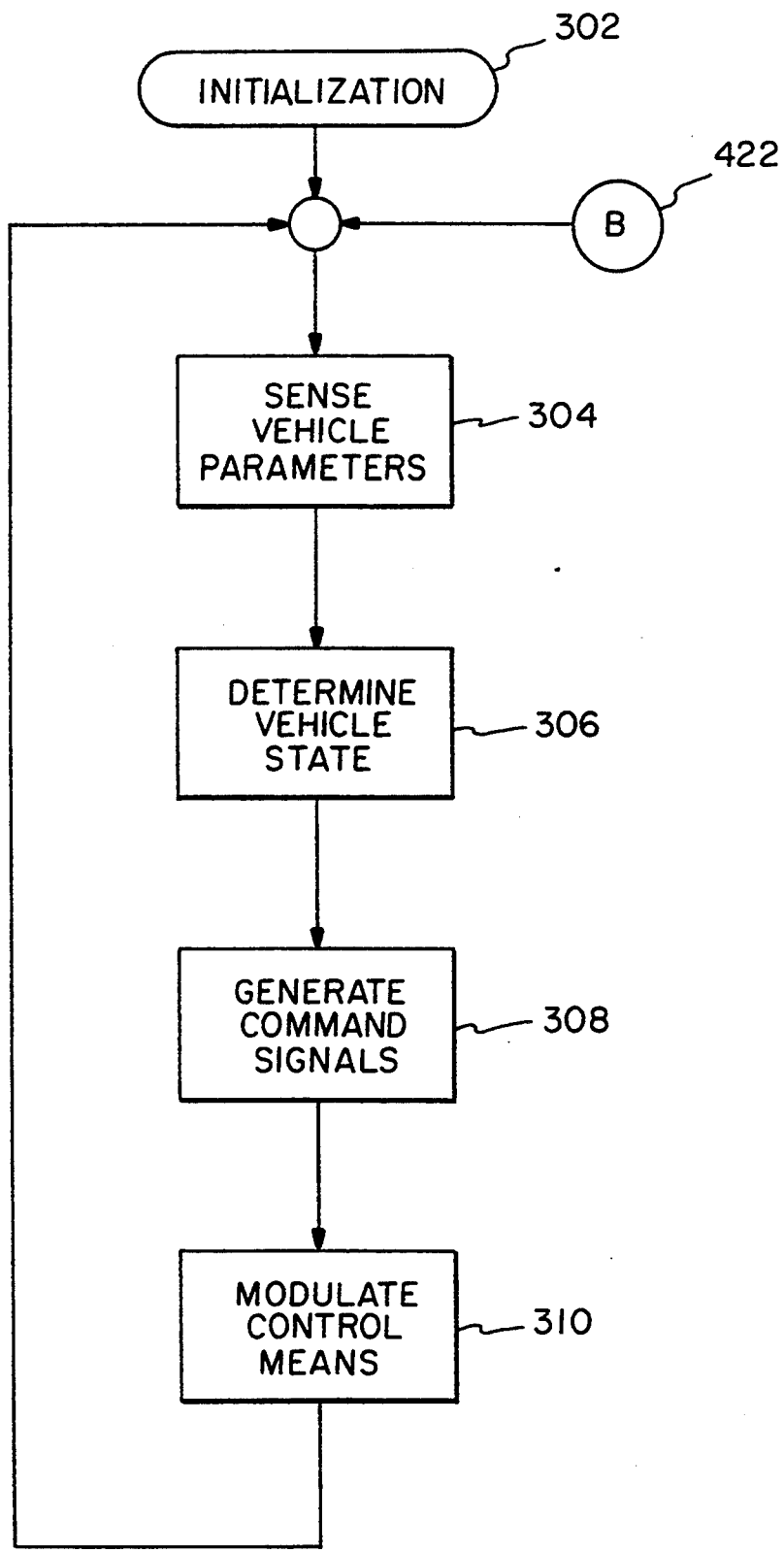

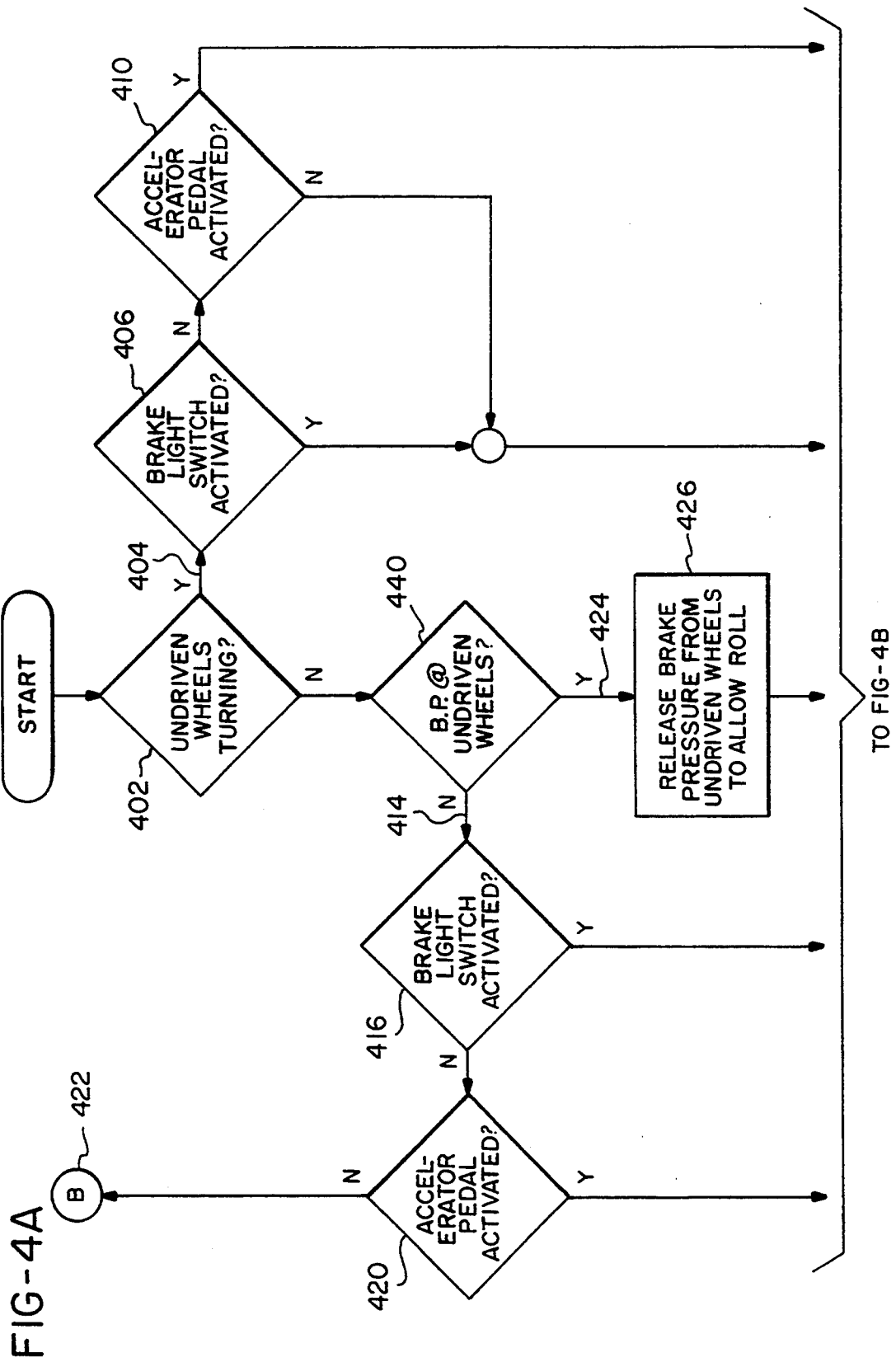

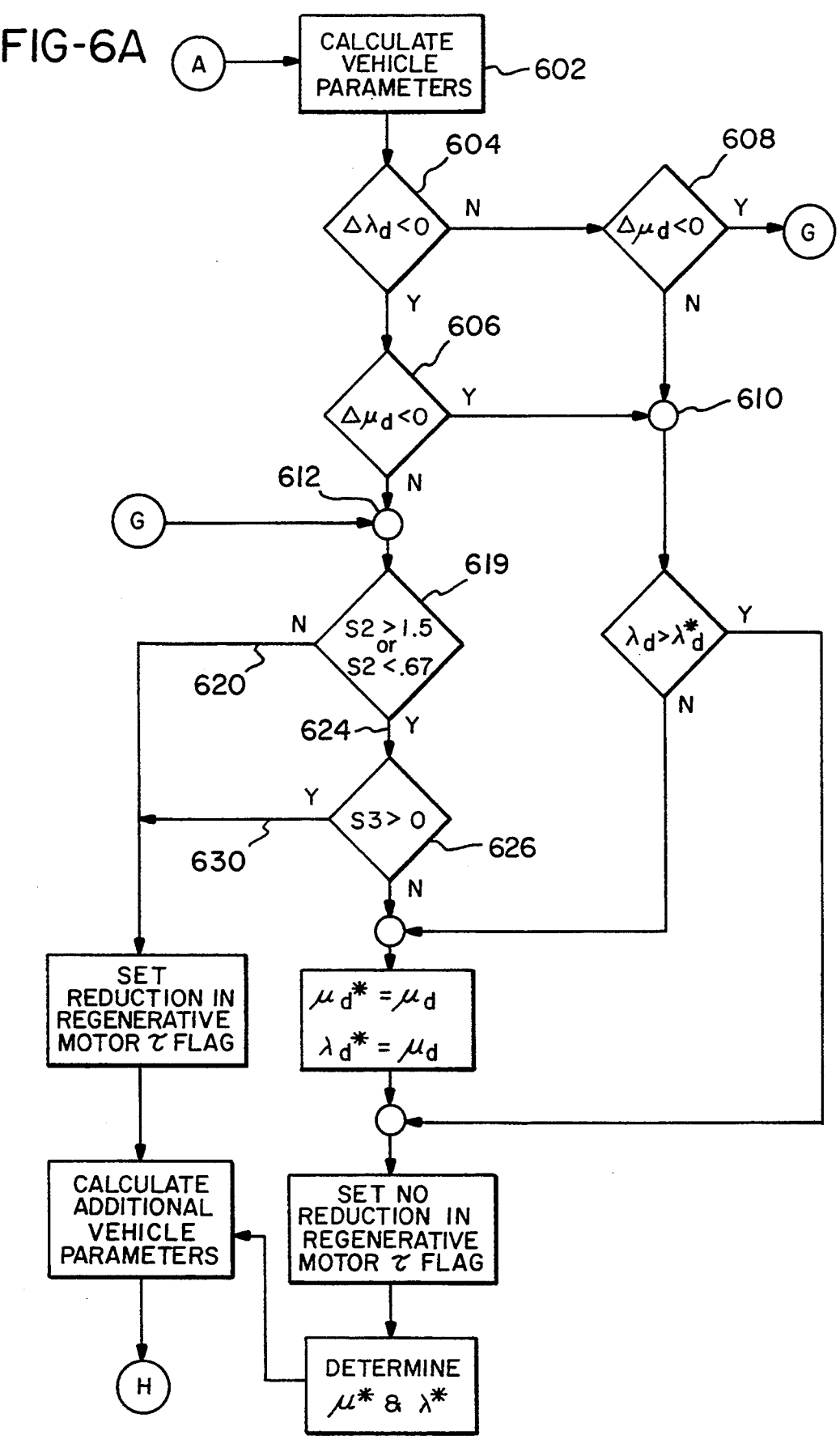

ELECTRIC VEHICLE REGENERATIVE ANTISKID BRAKING AND TRACTION CONTROL SYSTEM

The U.S. Government has rights in this invention pursuant to Contract No. DE-AC07-90ID13019, awarded by the U.S. Department of Energy.

BACKGROUND OF THE INVENTION

The present invention relates generally to antiskid braking and traction control for a vehicle and, more particularly, to a system and method for providing such control in an electric or hybrid vehicle having a regenerative braking system operatively connected to an electric traction motor, and a separate hydraulic braking system.

Antiskid braking and traction control systems are well known and commonly employed in conventional internal combustion engine vehicles. However, the development of electric and hybrid vehicles has introduced concerns and opportunities unique to electric vehicle control system design. A primary area of concern in electric vehicle design, because of limited battery storage, is the amount of energy used by the various vehicle subsystems. Therefore, designing vehicle control systems that minimize energy use and conserve the available energy stored in the battery is critical. Vehicles driven by electric traction motors not only provide opportunities to conserve energy, but such vehicles also provide unique opportunities for energy regeneration. The braking and traction control systems of such vehicles are especially well-suited for such conservative and regenerative applications.

The kinetic energy that an electric or hybrid vehicle dissipates during braking, or any other period in which the accelerator pedal is not depressed and the vehicle is in motion, e.g. coasting, can advantageously be regenerated. Such regeneration can be accomplished by controlling the operation of the electric traction motor so that it behaves as a generator. The kinetic energy received during this process can be used to recharge the traction battery and stored for future use. Applying supplemental hydraulic braking only when the braking torque supplied by the electric traction motor cannot meet the driver's brake demand significantly increases the amount of energy recovered. The amount of kinetic energy that is wastefully dissipated while driving or launching an electric or hybrid vehicle is decreased if energy losses due to wheel slippage can advantageously be kept minimal. This can be accomplished by controlling the torque of the electric motor, independently of the driver's demand, through a conventional traction control slip regulator.

A regenerative braking system that maximizes the use of regenerative braking without causing locking or skidding of the vehicle wheels is shown in commonly assigned, U.S. Pat. No. 4,962,969 issued to Davis. However, the Davis patent does not teach or suggest minimizing the loss of kinetic energy, due to wheel slippage during acceleration, by controlling the torque produced by the electric traction motor during acceleration independently of the acceleration demand of the vehicle operator. In addition, the Davis patent does not provide for energy recovery by using regenerative braking during the antiskid braking mode of operation and does not take into account the cross-differential torque transfer through the differential or axle windup and damping which are significant during cornering and split mu road surfaces. Additionally, the Davis patent does not optimize energy recovery by only applying hydraulic brakes to the nondriven wheels with the exception of the driver demanding more braking than can be met with regenerative braking and maximum safe hydraulic nondriven wheel braking.

Accordingly, there is a need for a system and method for providing antiskid braking and traction control in an electric or hybrid vehicle which provides maximum regenerated kinetic energy during braking and minimizes the loss of kinetic energy due to wheel slip.

SUMMARY OF THE INVENTION

This need is met by a system and method of the present invention for providing antiskid braking and traction control in an electric or hybrid vehicle having a regenerative braking system operatively connected to an electric traction motor and a hydraulic braking system.

In accordance with one aspect of the present invention, an antiskid braking and traction control system having motor control means for controlling operation of the electric motor and brake control means for controlling fluid pressure applied at each wheel by the hydraulic braking system. A sensing means monitors vehicle parameters representative of vehicle behavior and a processing means calculates vehicle parameters defining the vehicle behavior not directly measurable by the sensing means, such as vehicle acceleration and road surface adhesion coefficient for each driven wheel, and determines a vehicle state of the vehicle based on the monitored and calculated vehicle parameters. The vehicle state may be any of requiring regenerative antiskid braking control, requiring hydraulic braking control, and requiring traction control. The processor then employs a control strategy based on the determined vehicle state and provides command signals to the motor control means to control operation of the electric traction motor and to the brake control means to control fluid pressure applied at each wheel to provide the appropriate regenerative antiskid braking control, hydraulic braking control, and traction control.

Preferably, the processing means further provides for determining a worst case wheel slip or skid condition among the driven wheels and for generating the command signals based on the worst case wheel slip or skid condition. The processor may determine the worst case wheel slip or skid condition by determining a driven wheel critical adhesion coefficient and a driven wheel critical slip or skid for each of the driven wheels, deriving a critical adhesion coefficient equal to a lowest value of the driven wheel critical adhesion coefficients, and deriving a critical wheel slip or skid equal to a value of the driven wheel critical slip or skid associated with the critical adhesion coefficient. The processing means preferably includes a braking strategy for determining the optimum proportionality between regenerative braking and hydraulic braking while providing a required braking demand.

In another aspect of the present invention, a method for providing antiskid braking and traction control for a vehicle having at least two driven wheels, a regenerative braking system operatively connected to an electric traction motor having motor control means for controlling the operation of the motor, and a separate hydraulic braking system having brake control means for adjusting the fluid pressure applied at each wheel by the hydraulic braking system, the method for providing antiskid braking and traction control comprising the steps of: sensing vehicle parameters to obtain real-time measurements defining vehicle behavior; calculating additional vehicle parameters describing vehicle behavior not directly measured in the step of sensing vehicle parameters; determining whether regenerative antiskid braking control, hydraulic braking control, or traction control is required based on the vehicle behavior; generating command signals, in response to the vehicle behavior, for controlling the motor control means of the electric traction motor and the brake control means of the hydraulic braking system such that the regenerative antiskid braking control, hydraulic braking control, or traction control is provided; and controlling the motor control means of the electric traction motor and the brake control means of the hydraulic braking system in accordance with the command signals.

It is thus a feature of the present invention to provide an improved regenerative antiskid braking and traction control system and method for an electric or hybrid vehicle which efficiently controls regenerative braking and reduces loss of kinetic energy due to wheel slip.

Other features and advantages of the invention will be apparent from the following description, the accompanying drawings and the appended claims.

BRIEF DESCRIPTION OF THE DRAWINGS

FIG. 2 is a graphical representation of the interrelationship of the adhesion coefficient $\mu$, between a wheel and a road surface, and the wheel slip or skid $\lambda$;

FIG. 3 is a flow chart illustrating a method for providing regenerative antiskid braking and traction control in accordance with the present invention;

FIGS. 4A and 4B are flow charts illustrating a method for determining the vehicle state in accordance with the present invention;

FIGS. 6A, 6B and 6C are flow charts illustrating a method for generating regenerative antiskid braking command signals.

DETAILED DESCRIPTION OF THE INVENTION

Figure 1:
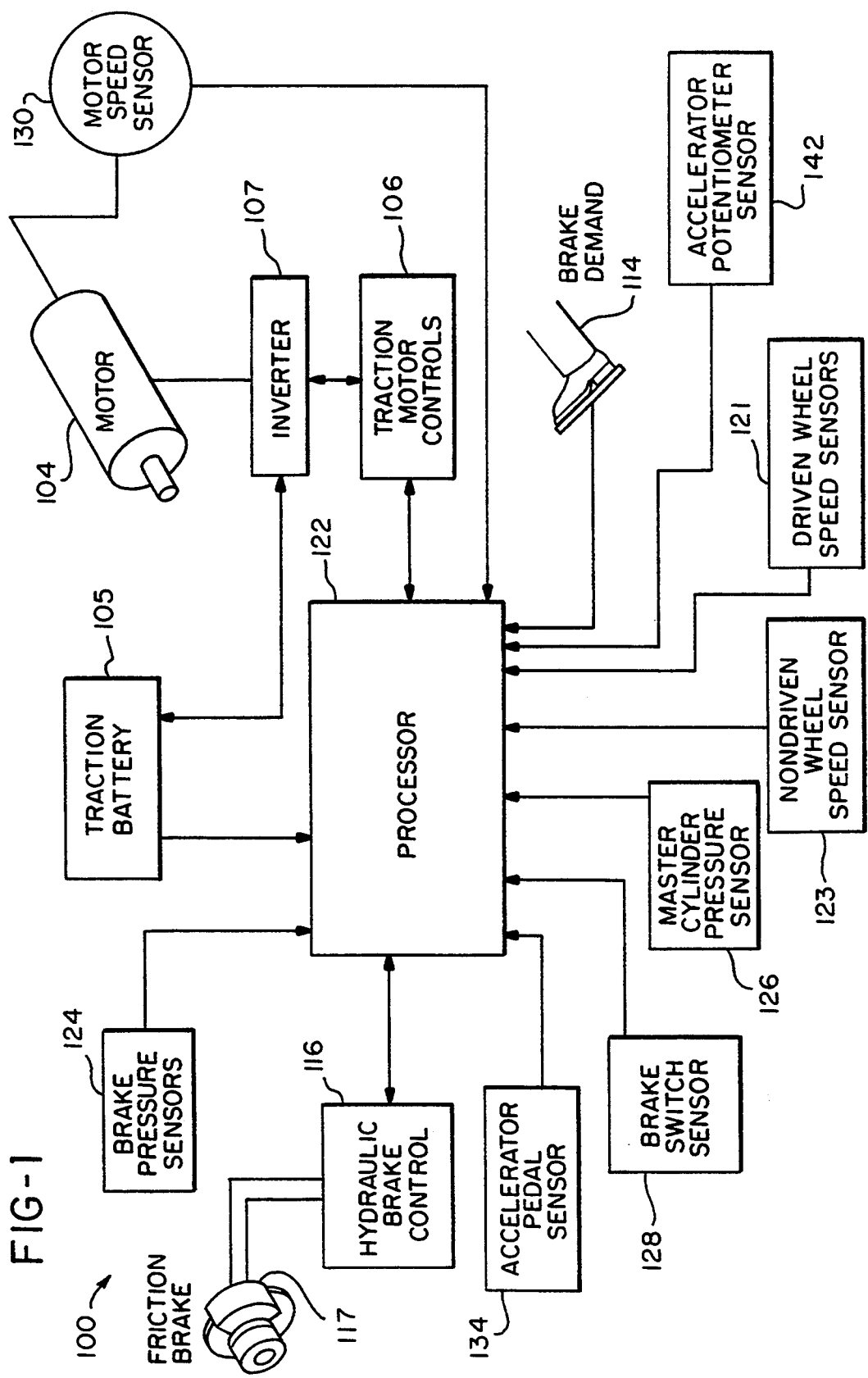
FIG. 1 is a block diagram of a regenerative antiskid brake and traction control system in accordance with the present invention.

Reference is now made to FIG. 1 which illustrates an regenerative antiskid braking and traction control system, generally designated by the reference numeral 100, according to the present invention for a vehicle having a conventional regenerative antiskid braking system operatively connected to an electric traction motor 104. The vehicle further includes a motor control means 106, such as a traction motor operator, for controlling the operation of the motor 104 and a traction battery 105 for supplying power to the motor 104 through an inverter 107. A separate, conventional hydraulic braking system is provided which includes a hydraulic brake control means 116, such as a conventional brake system controller, for controlling the fluid pressure applied to a conventional hydraulic brake 117 of each wheel (not shown), and a manual brake pedal 114. Commonly assigned, U.S. Pat. No. 4,963,969, issued to Davis, describes a vehicle having both regenerative and friction braking systems as discussed above, and is hereby incorporated by reference into the present specification.

In a preferred embodiment, the antiskid braking and traction control system 100 of the present invention includes a sensing means comprised of driven wheel speed sensors 121, nondriven wheel speed sensor 123, brake pressure sensor 124 for each driven wheel, and at least a brake pressure sensor to monitor for pressure in the brake line of the nondriven wheels (not shown), master cylinder pressure sensor 126, brake light switch sensor 128, motor speed sensor 130, electric motor current sensor and means for sensing operation of an acceleration pedal, for example acceleration pedal sensor 134 or acceleration potentiometer sensors 142, for sensing vehicle parameters to obtain real-time measurements representative of vehicle behavior. This control strategy is assuming a front rear brake split and is applicable to a diagonal brake split with brake pressure sensors at all wheels. In addition, pressure sensors would be required at all wheels for a four wheel drive vehicle. Since the structure and philosophy of the various sensors are well known in the art and are not important to the present invention beyond obtaining of the measurements, details of the sensors will not be further disclosed herein.

A processing means, illustrated as a processor 122 and responsive to the sensing means, is provided to determine a vehicle state based upon the obtained measurements. Possible vehicle states include requiring regenerative antiskid braking control, requiring hydraulic braking control, and requiring traction control. The present system 100 maximizes the kinetic energy generated during regenerative braking by using hydraulic braking to the nondriven wheels only, unless the vehicle operator brake demand 114 exceeds that which can be obtained by regenerative braking and maximum safe hydraulic nondriven wheel braking. The processor 122 employs a particular control strategy based on the determined vehicle state and provides appropriate command signals to the motor control means 106 and the brake control means 116 to control the operation of the electric traction motor 104 and the brake cylinder 117, respectively, to provide regenerative antiskid braking control, hydraulic braking control or traction control.

It should be noted that, in many vehicle control systems, it is prudent to provide for redundant measurements to ensure vehicle safety. In the present control system, redundant measurements are made to detect brake demand 114 by measuring the pressure of the master cylinder and determining the state of the brake light switch. Acceleration demand may also be redundantly detected in the preferred embodiment by measuring a conventional accelerator potentiometer, in addition to determining the state of the acceleration pedal switch.

Referring now to FIG. 3, a flow chart is shown which illustrates a method for providing regenerative antiskid braking control, hydraulic braking control and traction control in accordance with the present invention. Upon starting the vehicle, the system variables are initially assigned predetermined values 302. Vehicle parameters are then sensed 304 through the sensing means and, based on these sensed parameters, the vehicle state is determined 306 in accordance with the flow chart of FIG. 4, which is discussed in detail below. In response to the determined vehicle state, appropriate command signals are generated 308. The command signals then modulate 310 the brake control means 116 and the motor control means 106 to provide regenerative antiskid braking control, hydraulic braking control and traction control.

Figure 4B:
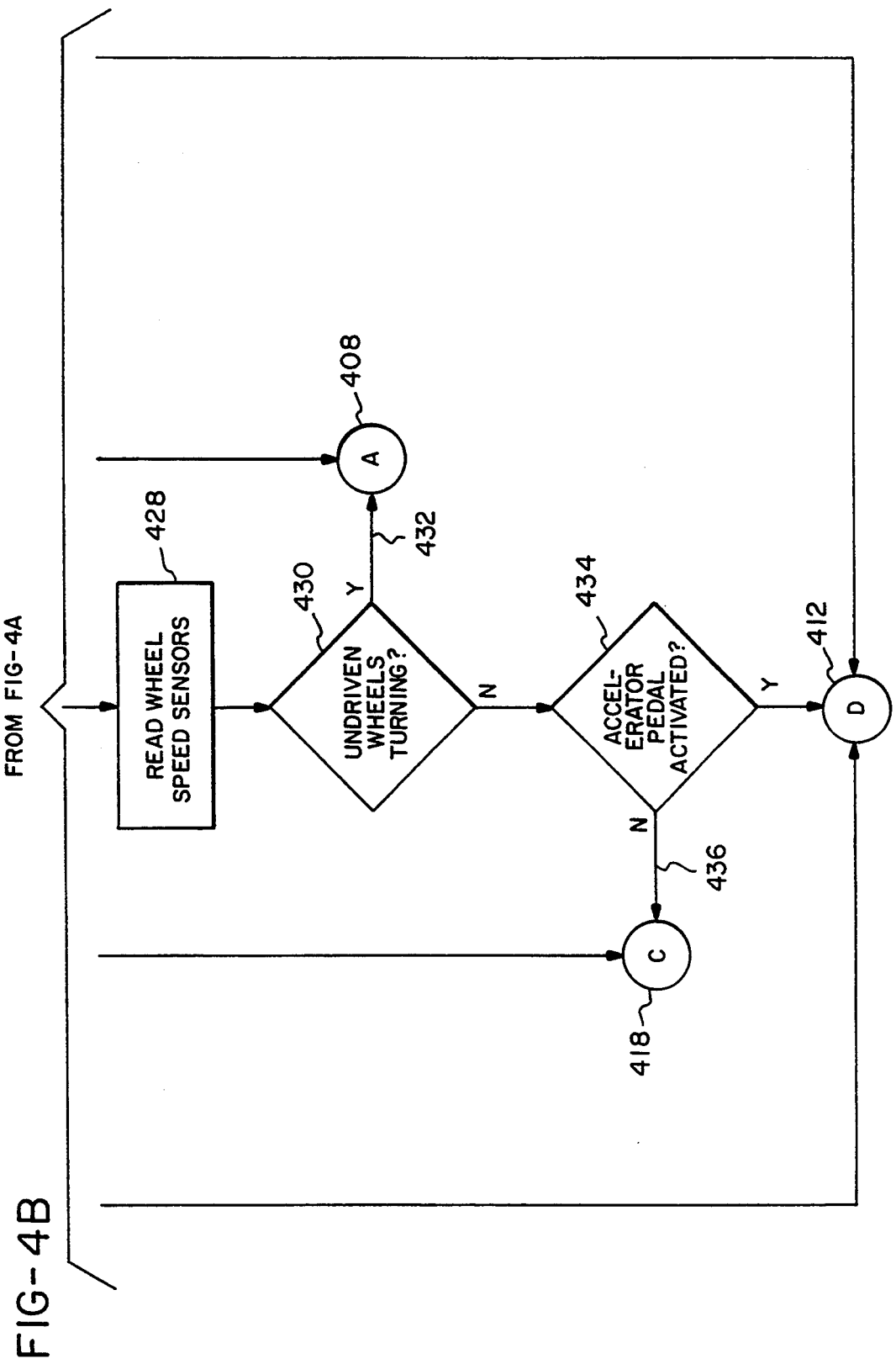

FIG. 4 is a flow chart, implemented by the processor 122, which illustrates a method for determining the vehicle state, shown as step 306 in FIG. 3. First, it is determined at step 402 whether the nondriven wheels are turning; if so, the vehicle is moving 404. If the vehicle is moving 404 and the operator is demanding brakes 406, determined by the brake light switch sensor 128 and pressure in the master cylinder detected by sensor 126 and the accelerator pedal is not activated, then the vehicle is operating in a state, illustrated as state A, requiring regenerative antiskid braking control 408. If the vehicle is moving 404 and the operator is demanding brakes 406 and the accelerator pedal is activated then the accelerator positive torque command is summed with the brake torque command (negative) and that sum is compared to zero. If that sum is greater than zero then the state of traction control is selected. If that sum is not greater than zero then the state of regenerative antiskid braking control is selected. If the vehicle is moving 404 and the operator is not demanding brakes 406 and the accelerator pedal is activated 410, then the vehicle is operating in a state, illustrated as state D, requiring traction control 412. If the vehicle is moving 404 and the operator is not demanding brakes 406 and the accelerator pedal is not activated 410, i.e. the vehicle is coasting, then the vehicle is operating in state A requiring regenerative antiskid braking control 408.

Alternatively, if the nondriven wheels are not turning 402, the brake pressure present at nondriven wheels is determined 440. If brake pressure is not present at the nondriven wheels, then the vehicle is not moving 414. If the vehicle is not moving 414 and the brakes are applied to the driven wheels 416, then the vehicle is operating in a state, illustrated as state C, requiring only hydraulic braking control 418. If the vehicle is not moving 414, the brakes are not activated 416, and the accelerator pedal is activated 420, then the vehicle is in state D requiring traction control 412. If the vehicle is not moving 414, the brakes are not activated 416, and the accelerator pedal is not activated 420, then the vehicle does not require any braking or traction control 422, shown as state B. When no braking or traction control is required 422, the control system simply returns to FIG. 3 and continues this loop until a state requiring braking or traction control is detected.

Finally, if the nondriven wheels are not turning 402 and brake pressure is present at the nondriven wheels 440, then the vehicle is either stopped or skidding with all of the wheels locked up 424. To determine whether the vehicle is skidding, the control system releases brake pressure to the nondriven wheels long enough to allow the nondriven wheels to spin 426 and the wheel speed sensors 123 are read to detect wheel movement 428. If the wheels spin when brake pressure is released 430, then the vehicle is skidding 432 and, in state A, requiring regenerative antiskid braking control 408. Alternatively, if the wheels do not spin when brake pressure is released 430, and the accelerator pedal is depressed 434, then the vehicle is operating in state D requiring traction control 412. Finally, if the wheels do not spin when brake pressure is released 430 and the accelerator is not depressed 434, then the vehicle is stopped 436 and in state C requiring only hydraulic braking control 418.

The vehicle state determines the control strategy employed by the processor 122 to generate the appropriate command signals for the type of control required. For example, in the preferred embodiment, the braking control command signals include a front hydraulic braking control signal and a rear hydraulic braking control signal when the vehicle is in a state requiring only hydraulic braking control. These command signals modulate the hydraulic brake control means 116 so that a predetermined level of hydraulic brake pressure is applied at each wheel. Alternatively, the braking control command signals include a rear hydraulic braking control signal, a front hydraulic braking control signal, and a regenerative antiskid braking control signal for modulating the braking control means 116 and the motor control means 106 when the vehicle is in a state requiring regenerative antiskid braking control. Finally, the traction control command signals include a reduction in motor torque control signal for modulating the motor control means 106 when the vehicle is in a state requiring traction control.

The theory behind traction control and antiskid braking control, and more specifically, the estimation of critical adhesion coefficient $\mu^*$ and critical slip or skid $\lambda^*$, will now be briefly explained with reference to FIG. 2. In FIG. 2, a graph 200 is shown having a wheel slip or skid $\lambda$ vs. adhesion coefficient $\mu$ curve 202, hereinafter denoted the slip vs. mu curve, for a road surface having a high adhesion coefficient, such as dry pavement, and a slip vs. mu curve 204 for a road surface having a low adhesion coefficient, such as ice. The adhesion coefficient $\mu$ represents the coefficient of friction between the tire surface and the road surface. Quadrant III of FIG. 2 illustrates conditions requiring antiskid braking control, while quadrant I of FIG. 2 illustrates conditions requiring traction control.

Referring now to quadrant I of FIG. 2, when driving torque is applied to a pneumatic tire, a tractive force, proportional to the adhesion coefficient $\mu$, develops at the area where the tire contacts the road surface. The tire tread in front of, and within the contact area, is subject to compression while the wheel is being driven. Hence, the distance the tire travels when subject to a driving torque will be less than when it is free rolling. The adhesion coefficient $\mu$ at the contact area is a function of wheel slip $\lambda$ and road surface conditions.

Wheel slip $\lambda$ is defined as the relative difference between the speed of a driven wheel $\omega_d$, detected by driven wheel speed sensor 121, and the speed of the vehicle V divided by the radius $R_w$ which is divided by the speed of the driven wheel $\omega_d$. Wheel slip is associated with traction control and wheel skid with antiskid braking control. Additionally, for ease of description, vehicle parameters relating to a driven wheel component will be designated with a subscript ($_d$).

When the vehicle is operating in quadrant I of FIG. 2 and thus, requires traction control, the wheel slip $\lambda_d$ for each driven wheel is calculated according to the following equation:

$$\lambda = (\omega_d - V/R_w)/\omega_d; \quad \omega_d > V/R_w \qquad (1)$$

wherein $\omega_d$ is the wheel speed of the subject driven wheel and $V/r_w$ is the vehicle speed as measured by nondriven wheel sensor 123. Wheel slip $\lambda$ is always positive when traction control is required due to the compression of the tire surface caused by the acceleration demand. This compression results in a wheel speed $\omega$ greater than the vehicle speed $V/R_w$ during acceleration.

As illustrated by the curve 202 in FIG. 2, the adhesion coefficient $\mu$ increases as wheel slip $\lambda$ increases until a critical value of wheel slip $\lambda^*$, denoted by vertical line 218, is surpassed. As wheel slip $\lambda$ increases beyond this critical slip value 218, the wheel approaches free spin, shown at 220. In this region of the curve 202 beyond the critical wheel slip $\lambda^*$, the vehicle is unstable and a condition of excessive wheel slip exists since the available energy demanded by the vehicle operator is increasingly used to accelerate the wheel inertia rather than the vehicle.

To regain vehicle stability when a condition of excessive spin exists, motor torque must be reduced so the driven wheels decelerate to a speed that allows for the maximum traction between the tires and road surface. Optimal vehicle acceleration occurs when the actual wheel slip $\lambda$ is equal to the critical wheel slip $\lambda^*$ for the present road surface. Therefore, the reduction in motor torque required to provide optimal acceleration is a function of the operating point of each driven wheel on the slip vs. mu curve in relation to the critical wheel slip $\lambda^*$.

Conversely, when braking torque is applied to a pneumatic tire, the tire tread in front of, and within the contact area of the tire, is subject to tension. Hence, the distance the tire travels when subject to braking torque will be greater than when it is free rolling. The tractive force developed at the contact area is a function of wheel skid $\lambda$ and road surface conditions. When the vehicle is operating in a state requiring regenerative antiskid braking control, wheel skid for each driven wheel $\lambda_d$ is calculated according to the following equation:

$$\lambda_d = (\omega_d - V/R_w)/(V/R_w); \quad \omega_d < V/R_w \tag{2}$$

wherein $\omega_d$ is the driven wheel speed and $V/R_w$ is vehicle speed.

Wheel skid $\lambda$ is always negative when regenerative antiskid braking control is required because of the tension caused by the braking demand. As a result of this tension, the wheel speed $\omega$ is always less than the vehicle speed $V/R_w$ during braking. As illustrated by curve 202 in FIG. 2, the adhesion coefficient $\mu$ decreases as wheel skid $\lambda$ decreases until a critical value of wheel skid $\lambda^*$, illustrated as line 210, is surpassed. Beyond this critical skid value $\lambda^*$, the adhesion coefficient $\mu$ increases and the wheel approaches lock-up, shown at 212, which leads to vehicle instability. To regain vehicle stability when a condition of excessive skid exists, regenerative motor braking torque must be reduced so the driven wheels can accelerate to a speed that allows for the maximum traction between the tire and road surface. Optimal vehicle deceleration occurs when the wheel slip $\lambda$ is at the critical wheel skid $\lambda^*$ for the present road surface.

From the discussion above, it is apparent that an accurate determination of vehicle speed is critical for the detection of an impending skid or excessive slip condition by the antiskid braking and traction control system. Moreover, accurate knowledge of vehicle speed and vehicle acceleration is of particular importance in the present application since several calculations necessary to maximize regenerative antiskid braking are functions of vehicle speed and acceleration.

While several methods of calculating vehicle acceleration are known in the art, acceleration is calculated in the present application according to the following equation whenever hydraulic brakes are being applied to the nondriven wheels:

$$Dv = [k(2(\Theta_e/G_r) - \Theta_{rd} - \Theta_{ld}) + \beta(2(W_e/G_r) - W_{rd} - W_{ld}) - J_r(\alpha_{rd} + \alpha_{ld}) - \tau_{br} - \tau_{bl}]/R_w M_v \tag{3}$$

wherein k is the spring rate of the vehicle drive axle, $\Theta_e$ is the integral of the electric motor speed, $G_r$ is the combined gear ratio of the differential and the transmission, $\Theta_{rd}$ and $\Theta_{ld}$ are the integrals of the right and left driven wheel speeds respectively, $J_r$ is the wheel inertia, $\beta$ is the damping rate between the motor shaft and the wheels, due to bearings, $W_e$ is electric motor speed, $W_{rd}$ is the speed of the right driven wheel, $W_{ld}$ is the speed of the left driven wheel, $\alpha_{rd}$ and $\alpha_{ld}$ are the time derivatives of the right and left driven wheel speeds respectively, i.e. driven wheel acceleration rates, $\tau_{br}$ and $\tau_{bl}$ are the hydraulic brake torques applied to the right and left driven wheels respectively, $R_w$ is the radius of the wheel, and $M_v$ is the mass of the vehicle. During vehicle acceleration Dv is positive and, during vehicle decelleration, Dv is negative.

Notably, this calculation accounts for the axle spring rate and damping rate in addition to the torque required to accelerate the driven wheel inertias. These values are especially significant when large transmission and differential gear ratios are present. Prior art regenerative or antiskid braking strategies have not accounted for these parameters when calculating vehicle acceleration. Moreover, acceleration calculated according to EQ. 3 is more robust to noisy measurements because it uses time integrations of the wheel speed.

Whenever hydraulic braking is not applied to the nondriven wheels, acceleration is simply calculated as the time derivative of the vehicle speed v as measured by the nondriven wheel speed sensor 123:

$$Dv = (v(t) - v(t-T))/T \tag{4}$$

wherein $v(t)$ is the vehicle speed at time t, T is the sampling rate, and $v(t-T)$ is the vehicle speed at time t minus the sampling rate T (the previous vehicle speed).

An accurate determination of the adhesion coefficient $\mu$ is also critical to determining the current operating point of a driven wheel on the slip vs. mu curve. Again, several methods of calculating $\mu$ are known in the art; however, the present application calculates $\mu$ for each driven wheel according to the following equations:

$$\mu_{dr} = [k(2(\Theta_e/G_r) - \Theta_{rd} - \Theta_{ld}) + \beta(2(W_e/G_r) - W_{rd} - W_{ld}) - 2\tau_{br} - 2J_r\alpha_{rd}]/2R_w N_v \tag{5A}$$

$$\mu_{dl} = [k(2(\Theta_e/G_r) - \Theta_{rd} - \Theta_{ld}) + \beta(2(W_e/G_r) - W_{rd} - W_{ld}) - 2\tau_{bl} - 2J_r\alpha_{ld}]/2R_w N_v \tag{5B}$$

wherein k is the spring rate of the vehicle drive axle, $\beta$ is the damping rate between the motor-shaft and wheel, $\Theta_e$ is the integral of the electric motor speed, $G_r$ is the combined gear ratio of the differential and the transmission, $\Theta_{rd}$ and $\Theta_{ld}$ are the integrals of the right and left driven wheel speeds respectively, $W_{rd}$ and $W_{ld}$ are the right and left driven wheel speeds, $W_e$ is the motor speed, $J_r$ is the wheel inertia, $\alpha_{rd}$ and $\Theta_{ld}$ are the time derivatives of the speed of the driven wheels being monitored, i.e. the driven wheel acceleration rate, $\tau_{br}$ and $\tau_{bl}$ are the hydraulic brake torques applied to the subject wheel, $R_w$ is the radius of the wheel, and $N_v$ is the normal force on the respective wheel.

The normal force, $N_v$, changes as a function of the weight shift of the vehicle during braking and acceleration. For example, the normal force on the respective front wheel is calculated according to the following relationship:

$$N_{vf} = \frac{((W*C)/L) - ((W*Dv*h)/(g*L))}{2} \quad (6)$$

wherein W is the vehicle weight, C is the distance from the vehicle center of gravity to the center of the rear axle, L is the wheel base, Dv is the vehicle acceleration, h is the height of the center of gravity from the road surface, and g is the acceleration of gravity at the earth's surface. An advantage of EQ. 5A, 5B and 6 is the inclusion of individual wheel acceleration, cross-differential torque transfer, and axle windup in determining the road surface adhesion coefficients for the right and left driven wheels. These values are especially significant under certain driving conditions such as cornering and slippery road surfaces.

Figure 5A:
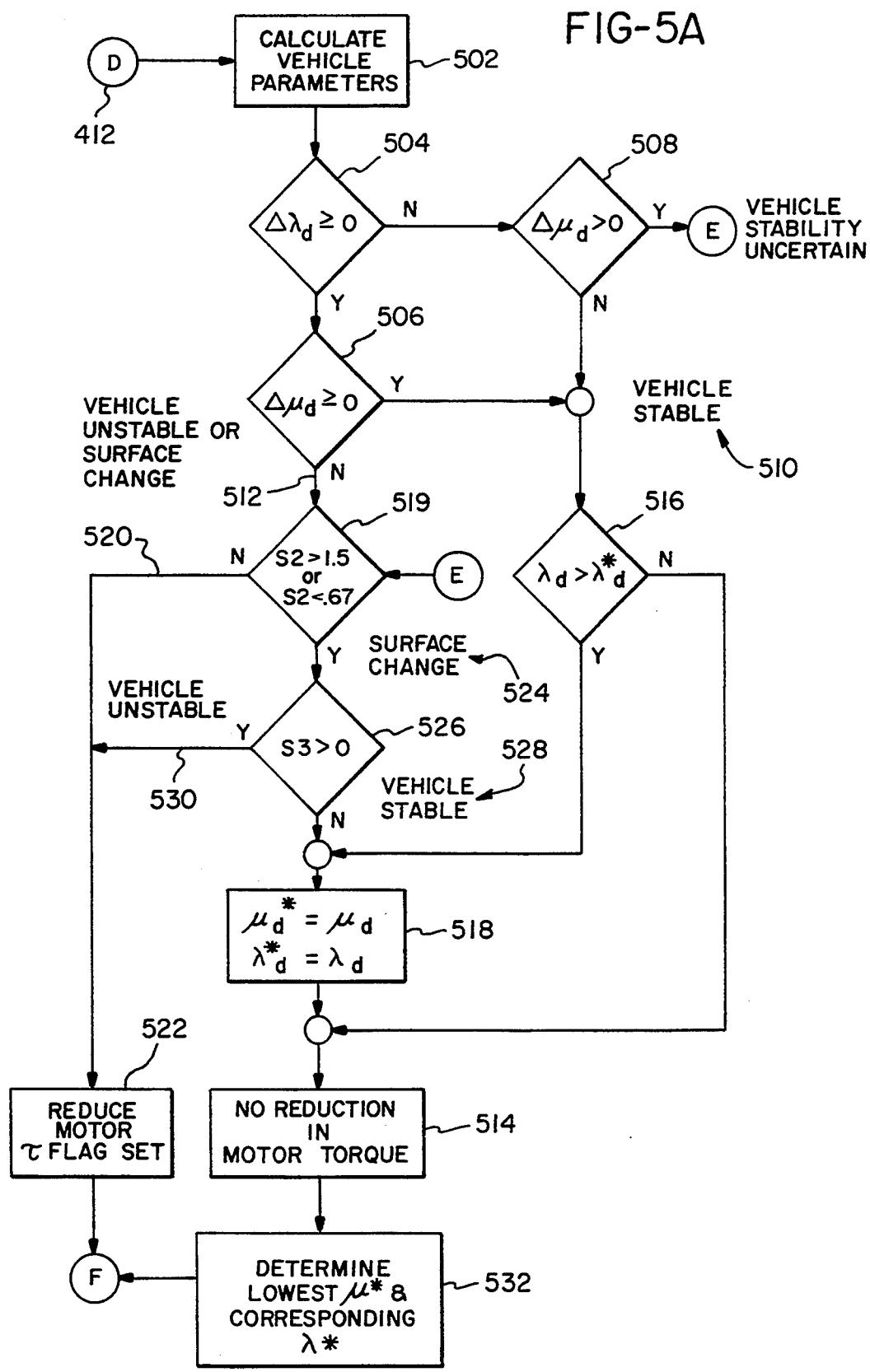
FIGS. 5A and 5B are flow charts illustrating a method for generating traction control command signals.
Figure 5B:
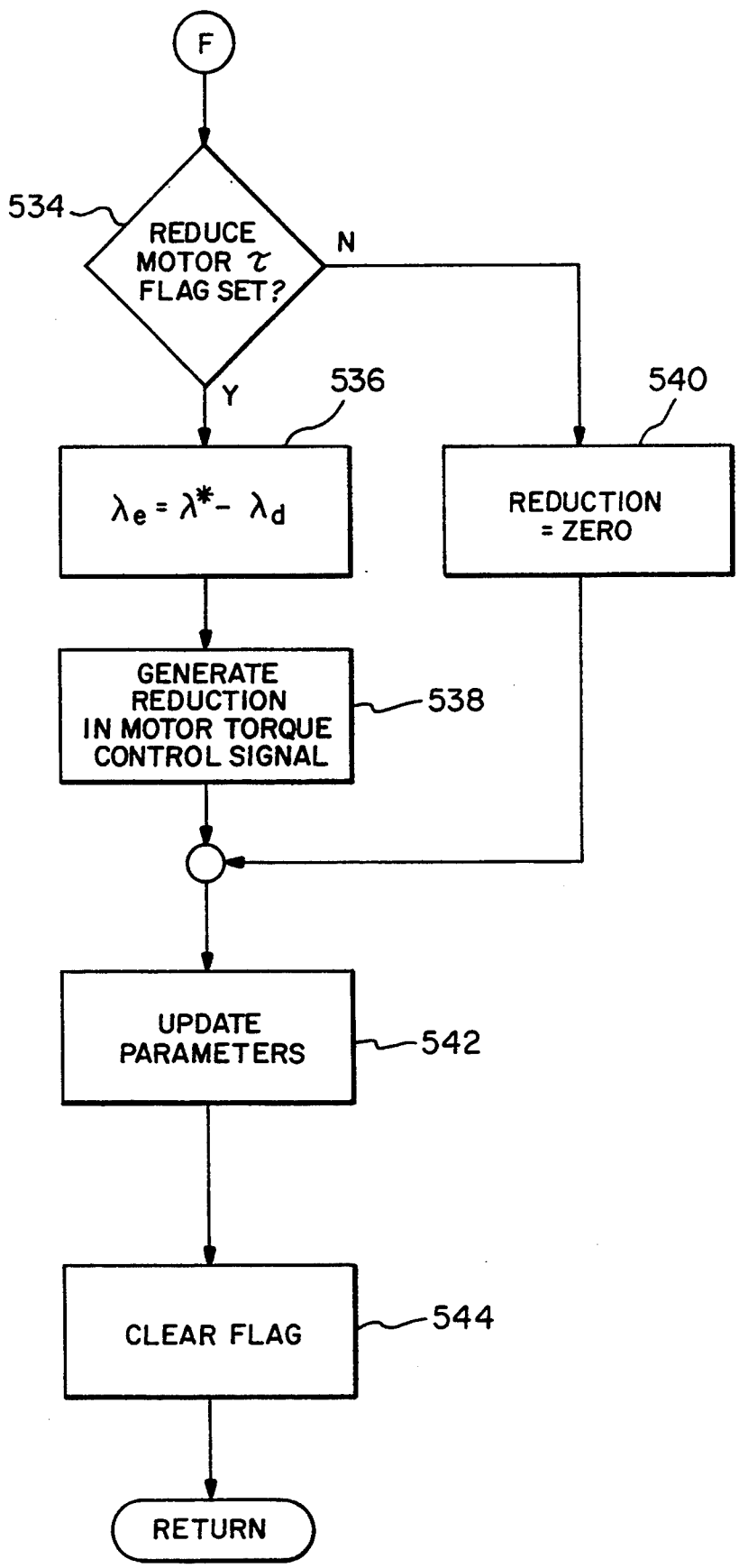

A method for generating the command signals when the vehicle is operating in a state requiring traction control, state D of FIG. 4, is illustrated as a flow chart in FIG. 5. The processor 122 in this embodiment further includes calculating means for calculating vehicle parameters defining vehicle behavior not directly measurable by the sensing means. According to the method shown in FIG. 5, vehicle parameters defining vehicle behavior not directly measurable by the sensing means are first calculated 502. The calculated vehicle parameters include wheel slip of each driven wheel $\lambda_d$ (EQ. 1); adhesion coefficients of each driven wheel $\mu_d$ (EQ. 5A and 5B); wheel acceleration of each driven wheel $a_d$ ($d\omega_d/dt$); vehicle acceleration Dv (EQ. 4); the difference between present adhesion coefficient $\mu_d$ and previous adhesion coefficient $\mu_{do}$ for each driven wheel $\Delta\mu_d$; the difference between present wheel slip $\lambda_d$ and previous wheel slip $\lambda_{do}$ for each driven wheel $\Delta\lambda_d$; the ratio of present adhesion coefficient $\mu_d$ to previous adhesion coefficient $\mu_{do}$ for each driven wheel $S1_d$; the slope of the slip vs. mu curve for each driven wheel, $S2_d$; the ratio of the present to previous slope of the slip vs. mu curve for each driven wheel, $S3_d$; and the difference between slip $\lambda$ and critical slip $\lambda^*$, as estimated in accordance with FIG. 2 and discussed below, for each driven wheel, $\Delta\lambda^*_d$.

Thus, in the preferred embodiment, the remaining vehicle parameters are calculated according to the following equations:

$\Delta\mu_d = \mu_d - \mu_{do}$
$\Delta\lambda_d = \lambda_d - \lambda_{do}$
$S1_d = \mu_d/\mu_{do}$
$S2_d = \Delta\mu_d/\Delta\lambda_d$
$S3_d = S2/S2_{do}$
$\Delta\lambda^*_d = \lambda_d - \lambda^*_d$ Next, the processor 122 determines the worst case slip condition among the driven wheels. The worst case slip condition is determined by estimating a driven wheel critical adhesion coefficient $\mu^*_d$ for each driven wheel, estimating a critical wheel slip $\lambda^*_d$ for each driven wheel, determining a critical adhesion coefficient $\mu^*$ equal to the lowest value among the driven wheel adhesion coefficients $\mu^*_d$, and determining a critical slip $\lambda^*$ equal to the driven wheel critical slip associated with the driven wheel having the lower critical adhesion coefficient $\mu^*$. Initially, $\mu^*_d$ and $\lambda^*_d$ are assigned the respective calculated values of $\mu_d$ and $\lambda_d$. To estimate $\mu^*_d$ and $\lambda^*_d$ according to the present method, the processor 122 first determines whether each driven wheel of the vehicle is operating in the stable region of its slip vs. mu curve. If $\Delta\lambda_d$ is greater than or equal to zero 504 and $\Delta\lambda_d$ is greater than or equal to zero 506, or $\Delta\lambda_d$ is less than zero 504 and $\Delta\mu_d$ is less than or equal to zero 508, then the vehicle is stable 510. Otherwise, the vehicle is unstable 512 or experiencing a surface change which could make the vehicle stable or unstable.

If the vehicle is stable without experiencing a surface change 510, then no reduction in motor torque is required 514. However, if the vehicle is approaching the point of maximum tractive effort, i.e. the present wheel slip $\lambda$ is greater than critical wheel slip $\lambda^*$ 516, then $\mu^*_d$ and $\lambda^*_d$ are updated to the present values of $\mu_d$ and $\lambda_d$ respectively 518. Alternatively, if the vehicle is unstable or experiencing a surface change 512, then the processor 122 must determine whether the vehicle is experiencing a road surface transition.

In the preferred embodiment, this determination is based on, Sld, the ratio of present to previous road surface adhesion coefficient. If Sld is greater than a first predetermined value 519, then the vehicle is transitioning from a low adhesion to high adhesion road surface. If Sld is less than a second predetermined value 519, then the vehicle is transitioning from a high adhesion to low adhesion road surface. If a road surface transition is not detected 520, the reduce motor torque flag is set 522. However, if a road surface transition is detected 524, then the processor 122 determines whether the vehicle is remaining stable through the road surface transition based on the ratio of the present to previous slope of the slip vs. mu curve S3.

If S3 is not greater than zero 526, the vehicle is stable through the road surface transition 528 and no reduction in motor torque is required 514, but $\mu^*_d$ and $\lambda^*_d$ are updated 518 to the current values of $\mu_d$ and $\lambda_d$. Alternatively, if S3 is greater than zero 526, the vehicle is unstable during the road surface transition 530 and the reduce motor torque flag is set 522. The critical adhesion coefficient of each driven wheel $\mu^*_d$ and the critical wheel slip of each driven wheel $\lambda^*_d$ are not updated in this case since maximum tractive effort does not occur in this region.

After the reduce motor torque flag has been set and the critical values have been determined for each of the driven wheels, the critical adhesion coefficient $\mu^*$ is assigned a value equal to the lowest value among the driven wheel critical adhesion coefficients $\mu^*_d$ and the critical slip $\lambda^*$ is assigned a value equal to the driven wheel critical slip associated with the driven wheel critical adhesion coefficient $\mu^*_d$ having the lowest value 532. These critical slip $\mu^*$ and critical adhesion coefficient $\mu^*$ values represent the worst case slip condition among the driven wheels. By utilizing the worst case slip condition, the present invention is readily adaptable to operate on road surfaces having unequal adhesion coefficients for each driven wheel.

Once the worst case slip condition is determined, the processor 122 generates the reduction in motor torque control signal 538. If the reduce motor torque flag is set 534, an error signal, $\lambda e$, equal to the difference between the critical slip $\lambda^*$ and the current calculated slip of the driven wheel $\lambda_d$, representing the worst case slip condition, is calculated 536. The reduction in motor torque control signal, which determines the rate at which the motor torque will be reduced, is then generated based on the magnitude of the error signal $\lambda e$ 538. Alternatively, if the reduce motor torque flag is not set 534, an error signal is not generated and the reduction in motor torque control signal is set to zero 540. Finally, the parameters are updated 542 and the flags are cleared 544.

Figure 6B:
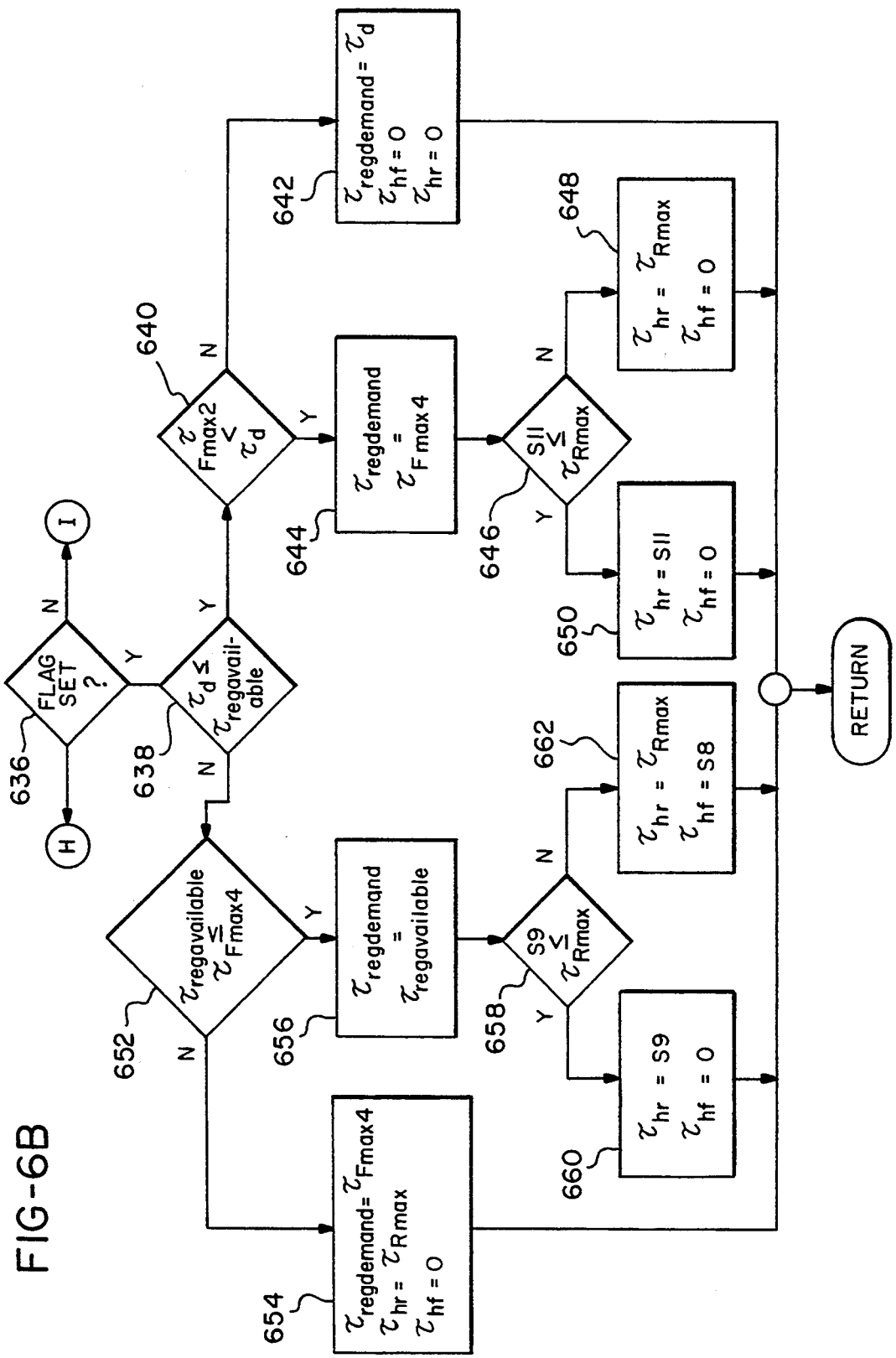
Figure 6C:
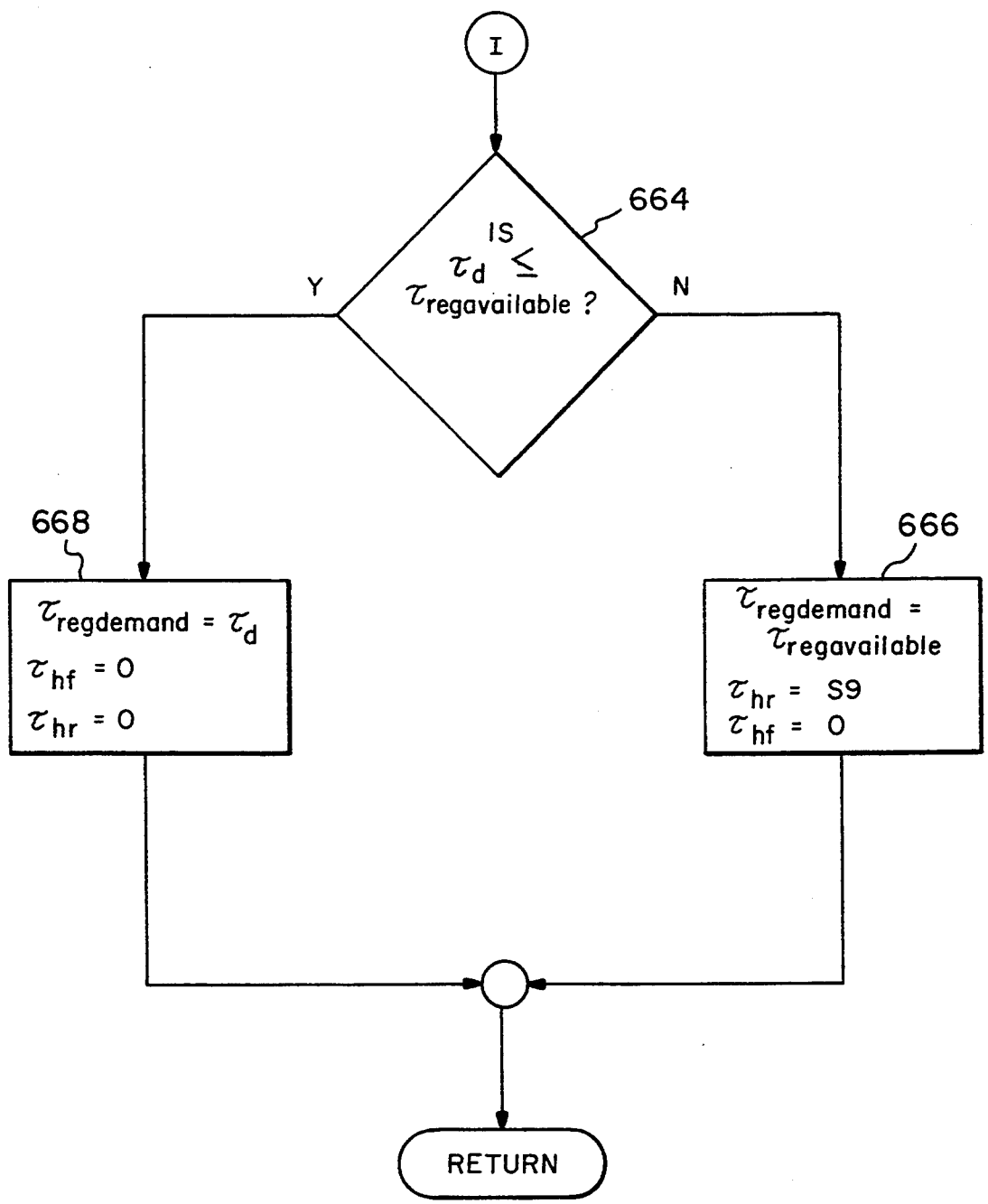

A method for generating the command signals when the vehicle is operating in a state requiring regenerative antiskid braking control, state A of FIG. 4, is shown in FIG. 6. First, the processor 122 calculates the same vehicle parameters 602 as noted above with respect to step 502 of FIG. 5, with the exception that the foregoing slip equation 2 now determines wheel skid and both equations for vehicle acceleration must be determined by equations 3 and 4. As should be appreciated, wheel slip in the above delineated equations should be replaced with wheel skid when controlling braking. In order to calculate vehicle speed when brakes are applied to all four wheels the integral of eq. 3 is required.

Next, the processor 122 determines whether each driven wheel of the vehicle is operating in the stable region of its skid vs. mu curve. If, for each driven wheel, $\Delta\lambda_d$ is less than zero 604 and $\Delta\mu_d$ is less than zero 606, or $\Delta\lambda_d$ is greater than or equal to zero 604 and $\Delta\mu_d$ is greater than or equal to zero 608, then the vehicle is stable 610. Alternatively, the vehicle is unstable 612 or experiencing a road surface change in which the vehicle may be stable or unstable.

If the vehicle is stable 610, then the no reduction in regenerative motor torque flag is set 614. When the present wheel skid $\lambda_d$ is not greater than the critical wheel skid $\lambda^*_d$ 616, the vehicle is approaching the point of maximum tractive effort. Therefore, $\mu^*_d$ and $\lambda^*_d$ must be updated 618. If the vehicle is at state G, the processor 122 determines whether the vehicle is experiencing a road surface transition. As described above for a vehicle requiring traction control, this determination is based on the Sld of the skid vs. mu curve 619. If Sld is greater than a first predetermined value, preferably 1.5 as shown in step 619, then the vehicle is transitioning from a low adhesion (curve 204 of FIG. 2) to high adhesion road surface (curve 202 of FIG. 2). If Sld is less than a second predetermined value, preferably 0.67 as shown in step 619, then the vehicle is transitioning from a high adhesion to low adhesion road surface.

If a road surface transition is not detected 620, then the reduction in regenerative motor torque flag is set 622. However, if a road surface transition is detected 624, then the processor 122 determines whether the vehicle is remaining stable through the transition based on the ratio of the present to previous slope S3 of the skid vs. mu curve 626. If the vehicle is stable through the transition 628, then $\mu^*_d$ and $\lambda^*_d$ are updated 618 and the no reduction in regenerative motor torque flag is set 614. Alternatively, the vehicle is unstable through the road surface transition 630, then the reduce regenerative motor torque flag is set 622. The critical driver wheel parameters, $\mu^*_d$ and $\lambda^*_d$, are not updated in this case since maximum braking effort does not occur in this region. After the appropriate flags have been set and the critical values are determined, then a critical adhesion coefficient $\mu^*$ and a critical skid $\lambda^*$ are determined and assigned 632, as described above with regard to the worst case skid condition among the driven wheels.

Once the worst case skid condition is determined, a braking strategy determines the optimum split between regenerative braking and hydraulic braking necessary to maximize regenerative braking while providing a required braking demand. In order to determine the optimum split, additional vehicle parameters are calculated 634. These additional parameters include the maximum brake torque that can be applied to the front wheels just before the skid point with no braking torque applied to the rear wheels, $\tau_{Fmax2}$, and the maximum brake torque that can be applied to the front wheels just before skid where brake torque is applied to all four wheels, $\tau_{Fmax4}$, according to the following equations:

$$\tau_{Fmax2} = R_w * [(\mu*N_y C)/(L-\mu*h)] \quad (7)$$

$$\tau_{Fmax4} = R_w * [(\mu*N_y)/L] * (C+\mu*h) \quad (8)$$

wherein C is the distance between the center of gravity of the vehicle and the center of the rear axle, h is the height of the center of gravity, and L is the wheel base. The normal force $N_y$ in Eqs. 7 and 8 is the normal force of the vehicle at the center of gravity.

The maximum brake torque that can be applied to the rear wheels just before skid when brake torque is applied to all four wheels, $\tau_{Rmax}$, is also calculated according to the following equation:

$$\tau_{Rmax} = R_w * [(\mu*N_y)/L] * (B-\mu*h) \quad (9)$$

wherein B is the distance between the center of gravity of the vehicle to the center of the front axle. Finally, various differences, S4–S11, used by the braking strategy to determine the optimal split are calculated according to the following equations:

S4 = $\tau_d - \tau_{regavailable}$
S5 = $\tau_{Fmax2} - \tau_d$
S6 = $\tau_{regavailable} - \tau_{Fmax4}$
S7 = $\tau_d - \tau_{regavailable} - \tau_{Rmax}$
S8 = $\tau_{Fmax4} - \tau_{regdemand}$
S9 = $\tau_d - \tau_{redemand}$
S10 = $\tau_d - \tau_{Fmax4} - \tau_{Rmax}$
S11 = $\tau_d - \tau_{Fmax4}$ wherein $\tau_d$ is the torque demanded by the driver, $\tau_{regavailable}$ is the available regenerative brake torque that the battery can accept, and $\tau_{regdemand}$ is the regenerative brake torque demanded. The brake torque is proportional to the hydraulic fluid pressure.

In a typical braking system, the master cylinder provides the brake demand signal to the system controller. The master cylinder provides hydraulic force potential to the front brake control valve and to the rear brake control valve. The just described braking system applies a front-rear split. The present invention may be applied to any braking system that isolates the front and rear hydraulic brakes, provides accumulators to each driven wheel and provides a single accumulator to the non-driven wheels.

Continuing with FIG. 6, one method of determining the optimal split between regenerative braking and supplemental hydraulic braking based on the additional calculations is now described. This method described is for a front wheel drive vehicle, however the control strategy can be applied to other drive configurations as well. If the reduce regenerative torque flag is set 636, $\tau_d$ is less than or equal to $\tau_{regavailable}$ 638, and $\tau_{Fmax2}$ is not less than $\tau_d$ 640, then the regenerative braking system is capable of providing the full brake demand without supplemental hydraulic braking. Therefore, the regenerative antiskid braking control signal, which determines the level of regenerative motor torque to be applied by the electric traction motor 104, is generated based on the magnitude of $\tau_d$ 642. Since no supplemental hydraulic braking is required, the front and rear hydraulic braking control signals, which determine the amount of hydraulic brake pressure to be applied at the driven and nondriven wheels by the hydraulic braking system are set to zero 642.

If the reduce regenerative torque flag is set 636, $\tau_d$ is less than or equal to $\tau_{regavailable}$ 638, and $\tau_{Fmax2}$ is less than $\tau_d$ 640 the regenerative braking system is unable to provide the full brake demand. However, supplemental hydraulic braking control is required only at the rear nondriven wheels. Therefore, $\tau_{regdemand}$ is set equal to $\tau_{Fmax4}$ 644, and S11 is compared with $\tau_{Rmax}$ to determine the amount of rear hydraulic braking required to meet the brake demand 646. If S11 is not less than or equal to $\tau_{Rmax}$ 646, the rear hydraulic braking control signal is generated based on the magnitude of $\tau_{Rmax}$ 648. Since the torque demand can be met without supplemental hydraulic braking of the driven wheels, the front hydraulic braking control signal is again set to zero 648. However, if S11 is less than or equal to $\tau_{Rmax}$ 646, then the rear hydraulic braking control signal is generated based on the magnitude of S11, and the front hydraulic braking control signal is zero 650.

If the regenerative motor torque flag is set 636, $\tau_d$ is not less than or equal to $\tau_{regavailable}$ 638, and $\tau_{regavailable}$ is not less than or equal to $\tau_{Fmax4}$ 652, then the regenerative brake system is not capable of providing the full brake demand without supplemental hydraulic braking of the nondriven wheels. The regenerative antiskid braking control signal, and rear hydraulic braking control signal are then generated based on the respective magnitudes of $\tau_{Fmax4}$ and $\tau_{Rmax}$ 654. Since hydraulic braking is not required at the driven wheels, the front hydraulic braking control signal is set to zero 654.

Alternatively, if the regenerative motor torque flag is set 636, $\tau_d$ is not less than or equal to $\tau_{regavailable}$ 638, and $\tau_{regavailable}$ is less than or equal to $\tau_{Fmax4}$ 652, then the regenerative braking system is again not capable of providing the full brake demand. Consequently, $\tau_{regdemand}$ is set equal to $\tau_{regavailable}$ 656, and S9 is compared with $\tau_{Rmax}$ to determine whether hydraulic braking of the driven wheels is required in addition to a combination of hydraulic braking of the nondriven wheels and regenerative braking in order to provide the full brake demand 658. In the event that S9 is less than or equal to $\tau_{Rmax}$ 658, then supplemental hydraulic braking of the driven wheels is not required. The front hydraulic braking control signal is set to zero, and the rear hydraulic braking control signal is generated based on the magnitude of S9 660. However, if S9 is not less than or equal to $\tau_{Rmax}$ 658, then supplemental hydraulic braking of the driven wheels is required and the front and rear hydraulic braking control signals are generated based on the magnitudes of S8 and $\tau_{Rmax}$ 662.

Alternatively, if the reduction in regenerative than or equal to $\tau_{regavailable}$ 664, then the regenerative motor torque flag is not set 636, i.e. the no reduction in regenerative motor torque flag is set, and $\tau_d$ is not less antiskid braking control signal, and rear hydraulic braking control signal are generated based on the magnitudes of $\tau_{regavailable}$ and S9 respectively 666. Since hydraulic braking is not required at the driven wheels, the front hydraulic braking control signal is set to zero 654. However, if the reduction in regenerative motor torque flag is not set 636, and $\tau_d$ is less than or equal to $\tau_{regavailable}$ 664, then the regenerative antiskid braking control signal is generated based on the respective magnitudes of $\tau_d$ 666. In this condition, supplemental hydraulic braking is not required at the driven or nondriven wheels and, therefore, the front and rear hydraulic braking control signals are set to zero 668.

As shown in step 310 of FIG. 3, the generated command signals are subsequently used to modulate the hydraulic brake 117 and the traction motor 104 through the brake control means 116 and traction motor control means 106, respectively, to provide the appropriate vehicle control.

An important note is that severe split-$\mu$ traction control, where the driven wheels are on road surfaces having different adhesion coefficients, can be performed by the present control system by the conventional method of brake application and release without additional hardware. However, a description of such control is not included herein, since such control is well known in the art and defeats the energy savings desired in electric vehicle applications.

Having thus described the data transmission system of the present invention in detail and by reference to preferred embodiments thereof, it will be apparent that modifications and variations are possible without departing from the scope of the invention defined in the appended claims.

What is claimed is:

1. An antiskid braking and traction control system for a vehicle having at least two driven wheels, a regenerative braking system operatively connected to an electric traction motor having motor control means for controlling the operation of said motor, and a separate hydraulic braking system having brake control means for controlling fluid pressure applied at each wheel by said hydraulic braking system, said antiskid braking and traction control system comprising:

sensing means for sensing vehicle parameters representative of vehicle behavior; and
   processing means, responsive to said sensing means,
      for calculating vehicle parameters defining said vehicle behavior not directly measurable by said sensing means,
      for determining a vehicle state of said vehicle based on said vehicle parameters, said vehicle state being any of requiring regenerative antiskid braking control, requiring hydraulic braking control, and requiring traction control,
      for employing a real time control strategy based on said vehicle state, and
      for providing command signals to said motor control means to control the operation of said electric traction motor and to said brake control means to control fluid pressure applied at each wheel to provide said regenerative braking control, hydraulic braking control, and traction control.

2. An antiskid braking and traction control system according to claim 1 wherein said sensing means includes:

driven wheel speed sensors for measuring wheel speed of said at least two driven wheels;
   two nondriven wheel speed sensors for measuring the wheel speed of two nondriven wheels;
   brake pressure sensors for measuring brake pressure on said at least two driven wheels and for measuring pressure in brake line of said two nondriven wheels;

a master cylinder pressure sensor for measuring hydraulic pressure of a master cylinder;

a brake switch sensor for sensing the operation of said brakes;

a motor speed sensor for measuring speed of said electric traction motor; and means for sensing the operation of an acceleration pedal switch.

3. An antiskid braking and traction control system according to claim 1 wherein said command signals include a rear hydraulic braking control signal, a front hydraulic braking control signal, and a regenerative antiskid braking control signal for modulating said brake control means and said motor control means when said vehicle is in said vehicle state requiring regenerative antiskid braking control.

4. An antiskid braking and traction control system according to claim 1 wherein said command signals include a front hydraulic braking control signal and a rear hydraulic braking control signal for modulating said brake control means when said vehicle is in said vehicle state requiring hydraulic braking.

5. An antiskid braking and traction control system according to claim 1 wherein said command signals include a reduction in motor torque control signal for modulating said motor control means when said vehicle is in said vehicle state requiring traction control.

6. An antiskid braking and traction control system according to claim 1 wherein said processing means further provides means for determining a worst case wheel slip condition among said driven wheels and for generating said command signals based on said worst case wheel slip condition.

7. An antiskid braking and traction control system according to claim 6 wherein said processing means further determines said worst case wheel slip condition by determining a driven wheel critical adhesion coefficient and a driven wheel critical slip for each of said driven wheels, deriving a critical adhesion coefficient equal to a lowest value of said driven wheel critical adhesion coefficient for each of said driven wheels, and deriving a critical wheel slip equal to a value of said driven wheel critical slip associated with said critical adhesion coefficient.

8. An antiskid braking and traction control system according to claim 1 wherein said processing means further includes a braking strategy for determining the optimum proportionality between regenerative braking and hydraulic braking while providing a required braking demand.

9. An antiskid braking and traction control system according to claim 1 wherein said processing means calculates vehicle acceleration, $Dv$, as one of said vehicle parameters according to the following equation whenever hydraulic brake pressure is applied to nondriven wheels:

$$Dv = \frac{[k(2(\theta_e/G_r) - \Theta_{rd} - \Theta_{ld}) - J_r(\alpha_{rd} + \alpha_{ld}) - \tau_{br} - \tau_{bl} + \beta(2(W_e/G_r) - W_{rd} - W_{ld})]}{R_w M_v}$$

wherein:

k is a spring rate of a drive axle of said vehicle, $\Theta_e$ is an integral of the speed of said motor, $G_r$ is a combined gear ratio of a differential and transmission of said vehicle, $\Theta_{rd}$ and $\Theta_{ld}$ are integrals of the speeds of right and left driven wheels of said vehicle respectively, $J_r$ is wheel inertia, $\alpha_{rd}$ and $\alpha_{ld}$ are time derivatives of the speeds of said right and left driven wheels respectively, $\tau_{br}$ and $\tau_{bl}$ are hydraulic brake torques applied to said right and left driven wheels respectively, $R_w$ is a radius of one of said driven wheels, $W_{rd}$ and $W_{ld}$ are speeds of the right and left driven wheels, $W_e$ is the motor speed, $\beta$ is the damping rate between the motor shaft and wheel, and $M_v$ is the mass of said vehicle; and according to the following equation whenever hydraulic braking is not applied to said nondriven wheels:

$$Dv = \frac{v(t) - v(t - T)}{T}$$

wherein:

v(t) is vehicle speed at time t,

T is sampling rate, and v(t−T) is vehicle speed at time t minus sampling rate, T.

10. An antiskid braking and traction control system according to claim 1 wherein said processing means calculates an adhesion-coefficient $\mu_d$ between a road surface and tire surface for each one of said driven wheels as one of said vehicle parameters, according to the following equation:

$$\mu_d = \frac{k(2(\Theta_e/G_r) - \Theta_{rd} - \Theta_{ld}) - 2\tau_d - 2J_r\alpha_d + \beta(2(W_e/G_r) - W_{rd} - W_{ld})}{2R_w N_v}$$

wherein:

k is a spring rate of a drive axle of said vehicle, $\Theta_e$ is an integral of the speed of said electric motor, $G_r$ is a combined gear ratio of a differential and a transmission of said vehicle, $\Theta_{rd}$ and $\Theta_{ld}$ are integrals of the speeds of right and left driven wheels respectively, $\tau_d$ is hydraulic brake torque applied to said one of said driven wheels respectively, $J_r$ is wheel inertia, $\alpha_d$ is a time derivative of the speed of said one of said driven wheels, $R_w$ is the radius of said one of said driven wheels, $N_v$ is a normal force on said one of said driven wheels $\beta$ is the damping rate between the motor shaft and wheel, $W_e$ is the motor speed, and $W_{rd}$ and $W_{ld}$ are speeds of the right and left driven wheels, respectively.

11. A method for providing antiskid braking and traction control for a vehicle having at least two driven wheels, a regenerative-braking system operatively connected to an electric traction motor having motor control means for controlling the operation of said motor, and a separate hydraulic braking system having brake control means for adjusting the fluid pressure applied at each wheel by said hydraulic braking system, said method for providing antiskid braking and traction control comprising the steps of:

sensing vehicle parameters to obtain real-time measurements defining vehicle behavior;

calculating additional vehicle parameters describing vehicle behavior not directly measured in said step of sensing vehicle parameters;

determining whether regenerative antiskid braking control, hydraulic braking control, or traction control is required based on said vehicle behavior;

generating command signals, in response to said vehicle behavior, for controlling said motor control means of said electric traction motor and said brake control means of said hydraulic braking system such that said regenerative antiskid braking control, hydraulic braking control, or traction control is provided; and controlling said motor control means of said electric traction motor and said brake control means of said hydraulic braking system in accordance with said command signals.

12. A method for providing antiskid braking and traction control according to claim 11 wherein said step of sensing vehicle parameters measures wheel speed of both driven wheels and both nondriven wheels, brake pressure applied at both driven wheels and at least brake pressure in the brake line of nondriven wheels, master cylinder pressure, activation of a brake light switch, electric motor speed electric motor current, and activation of accelerator pedal switch.

13. A method for providing antiskid braking and traction control according to claim 11 wherein said step of generating command signals includes the step of generating a rear hydraulic braking control signal, a front hydraulic braking control signal, and a regenerative antiskid braking control signal for modulating said motor control means, if said vehicle is in a state requiring regenerative antiskid braking control.

14. A method for providing antiskid braking and traction control according to claim 11 wherein said step of generating command signals includes the step of generating a front hydraulic braking control signal and a rear hydraulic braking control signal for modulating said brake control means, if said vehicle is in a state requiring hydraulic braking control.

15. A method for providing antiskid braking and traction control according to claim 11 wherein said step of generating command signals includes the step of generating a reduction in motor torque control signal for modulating said motor control means, if said vehicle is in a state requiring traction control.

16. A method for providing antiskid braking and traction control according to claim 11 wherein if said vehicle requires regenerative antiskid braking control or traction control, said step of generating command signals further comprises the step of determining a worst case slip condition among said at least one driven wheel.

17. A method for providing antiskid braking and traction control according to claim 16 wherein said step of determining a worst case slip condition comprises the steps of:

estimating a critical adhesion coefficient $\mu^*_d$ for each driven wheel;

estimating a critical slip $\lambda^*_d$ for each driven wheel;

deriving a critical adhesion coefficient $\mu^*$ for each driven wheel equal to a lowest value among said driven wheel critical adhesion coefficient for each driven wheel; and deriving a critical slip $\lambda^*$ equal to said critical slip associated with said critical adhesion coefficient.

18. A method for providing antiskid braking and traction control according to claim 14 wherein if said vehicle is in said state requiring regenerative antiskid braking control, said step of generating a command signal further includes the step of determining the optimum proportionality between regenerative braking and hydraulic braking necessary to maximize regenerative braking while providing a required braking demand.

19. A method for providing antiskid braking and traction control according to claim 11 wherein said step of calculating vehicle parameters includes calculating a vehicle acceleration, Dv, as one of said vehicle parameters according to the following equation whenever hydraulic brake pressure is applied to nondriven wheels:

$$D_v = \frac{[k(2(\theta_e/G_r) - \Theta_{rd} - \Theta_{ld}) - J_r(\alpha_{rd} + \alpha_{ld}) - \tau_{br} - \tau_{bl} + \beta(2(W_e/G_r) - W_{rd} - W_{ld})]}{R_w M_v}$$

wherein:

k is a spring rate of a drive axle of said vehicle, $\Theta_e$ is an integral of the speed of said electric motor, $G_r$ is a combined gear ratio of a differential and a transmission of said vehicle, $\Theta_{rd}$ and $\Theta_{ld}$ are integrals of right and left driven wheels of said vehicle respectively, $J_r$ is wheel inertia, $\alpha_{rd}$ and $\alpha_{ld}$ are time derivatives of said right and left driven wheel speeds respectively, $\tau_{br}$ and $\tau_{bl}$ are hydraulic brake torques applied to said right and left driven wheels respectively, $R_w$ is a radius of said at least one driven wheel, and $M_v$ is the mass of said vehicle;

$\beta$ is the damping rate between the motor shaft and wheel, $W_e$ is the motor speed, and $W_{rd}$ and $W_{ld}$ are speeds of the right and left driven wheels, respectively; and according to the following equation whenever hydraulic braking is not applied to said nondriven wheels:

$$D_v = \frac{v(t) - v(t-T)}{T}$$

wherein:

v(t) is vehicle speed at time t,

T is sampling rate, and v(t−T) is vehicle speed at time t minus sampling rate T.

20. A method for providing antiskid braking and traction control according to claim 11 wherein said step of calculating vehicle parameters includes calculating an adhesion coefficient $\mu_d$ between a road surface and tire surface at each one of said driven wheels, as one of said vehicle parameters, according to the following equation:

$$\mu_d = \frac{[k(2(\theta_e/G_r) - \Theta_{rd} - \Theta_{ld}) - 2\tau_d - 2J_r\alpha_d + \beta(2(W_e/G_r) - W_{rd} - W_{ld})]}{2R_w N_v}$$

wherein:

k is a spring rate of a drive axle of said vehicle, $\Theta_e$ is an integral of the speed of said electric motor, $G_r$ is a combined gear ratio of a differential and a transmission of said vehicle, $\Theta_{rd}$ and $\Theta_{ld}$ are integrals of the speeds of right and left driven wheels of said vehicle respectively;

$\tau_d$ is a hydraulic brake torque applied to said one driven wheel;

$J_r$ is wheel inertia;

$\alpha_d$ is a time derivative of the speed of said one driven wheel;

$R_w$ is a radius of said one driven wheel;

$N_v$ is a normal force on said one driven wheel;

$\beta$ is the damping rate between the motor shaft and wheel;

$W_e$ is the motor speed; and $W_{rd}$ and $W_{ld}$ are speeds of the right and left driven wheels, respectively.

* * * * *